Nov. 21, 1933.  E. P. BURRELL  1,936,446
CONTROL FOR HYDRAULIC OPERATING SYSTEMS
Filed Aug. 11, 1930   8 Sheets-Sheet 1

Nov. 21, 1933.  E. P. BURRELL  1,936,446
CONTROL FOR HYDRAULIC OPERATING SYSTEMS
Filed Aug. 11, 1930  8 Sheets-Sheet 3

Nov. 21, 1933.  E. P. BURRELL  1,936,446
CONTROL FOR HYDRAULIC OPERATING SYSTEMS
Filed Aug. 11, 1930  8 Sheets-Sheet 4

Patented Nov. 21, 1933

1,936,446

UNITED STATES PATENT OFFICE 1,936,446

CONTROL FOR HYDRAULIC OPERATING SYSTEMS

Edward P. Burrell, Shaker Heights, Ohio, assignor to The Warner & Swasey Company, Cleveland, Ohio, a corporation of Ohio Application August 11, 1930. Serial No. 474,611

32 Claims. (Cl. 29—42)

This invention relates to a control for hydraulic operating systems and has particular reference to systems wherein there is at least one hydraulically operated member whose rate of movement is to be controlled.

It is one of the objects of the invention to provide a control such that the hydraulically actuated member will be required to move at a constant speed either throughout its movement or through a predetermined portion thereof, regardless of leakage or variable rate of leakage in any parts of the hydraulic operating system.

A further object is to provide a control wherein the rate of movement of the hydraulically actuated member is automatically varied at points where a variation in rate of movement is desired.

A still further object is to provide for the automatic control of the actuated member in the form of a slide such that the said member is caused to move back and forth with a constant relatively slow rate of movement during a portion of its travel and at constant, relatively rapid rate or rates of movement during other portions.

Still further the invention aims to provide a system of control for a hydraulically actuated member such that the member may pass through a predetermined number of cycles of movement and then be automatically stopped, each cycle including forward and return reciprocating motions at varying rates of movement if desired and as desired.

A further object is to provide an adjustable device which will enable the period of dwell or the lapse of a time interval at the end of the movement of the hydraulically actuated member in one direction, and before the initiation of the movement in the opposite direction.

The above and other objects are attained by the present improved system of control, which will be described in the specification and set forth in the appended claims.

My control system may be used to advantage in many different kinds of machines and apparatus, but a particularly important field of use includes machine tools having a reciprocating tool or work holding member which is usually given a relatively slow feeding movement which must be of a constant nature regardless of leakage and regardless of the pressure on the sliding member by the action of the tool or tools on the work, and which is designed to have a relatively fast rate of movement in a forward direction up to a point near where the tool or tools engage the work, and a similar, relatively high rate of movement on the return stroke following the cutting operation or operations. Accordingly, I have illustrated my invention designed for, and applied to a machine tool, the particular tool being a turret lathe, and the hydraulically operated reciprocating member being in this instance the turret slide, but it is to be understood that in so illustrating the invention, I do not limit any part or all of the novel features of the present control system to this particular field, i. e., either turret lathes or other machine tools.

In the accompanying drawings.

Referring now to the drawings, the machine tool or lathe is provided with a bed 15 having ways 16 on which the hydraulically actuated sliding member, in this instance in the form of a tool supporting turret slide 17, is mounted, this slide being movable toward and from the head 18, and having a work spindle 19 which in this instance supports and rotates the work. In some instances the work piece is supported in the sliding member and the tool or tools in the relatively stationary member insofar as longitudinal movement is concerned, and, of course, the invention is equally applicable to that type of machine tool.

In a machine of the type herein illustrated, provided with a turret slide 17 having a tool holding turret 20, the tools are mounted on the several faces of the turret, here illustrated as six in number, the tools being caused to successively operate on the work and each cycle of movement including a rapid forward movement to bring the tool adjacent the work, then a relatively slow feeding movement for the cutting operation, then the stopping of the forward feeding movement, followed by a predetermined dwell of the tool at the completion of the cut, then a relatively rapid return movement back to the point where the cycle is to be repeated. Near the end of the return movement the turret is indexed, in this instance being moved through one-sixth of a revolution, so as to properly position the tool which is supported on the next or adjacent face of the turret and which operates during the next cycle of operations.

Many of the parts of the turret lathe may be of standard construction. For example, the work spindle may be rotated at any one of a plurality of speeds by standard multiple speed gearing usually contained in the head of a machine of this kind. Likewise, the indexing mechanism for the turret may be any of the usual standard forms employed in the customary mechanically operated turret lathes wherein the turret indexing takes place automatically during the latter portion of the return movement of the turret slide with any of the usual turret clamping or locking devices. As these are standard in machines of this kind, they are not herein illustrated.

As before stated, the turret slide 17 of this machine is moved back and forth over the ways 16 hydraulically, and by this is meant, of course, by means of a suitable relatively movable cylinder and piston and a suitable actuating fluid, generally a special oil, which is supplied through a valve on either side of the piston by a suitable pump which may be any of the standard forms employed in hydraulic operating systems of this general character. Of course, any suitable pump which supplies the fluid at a suitable pressure may be utilized which pump will have the usual relief valve which will act at any predetermined pressure. The pump itself is not herein illustrated, but the connections will be referred to presently.

Figure 2:
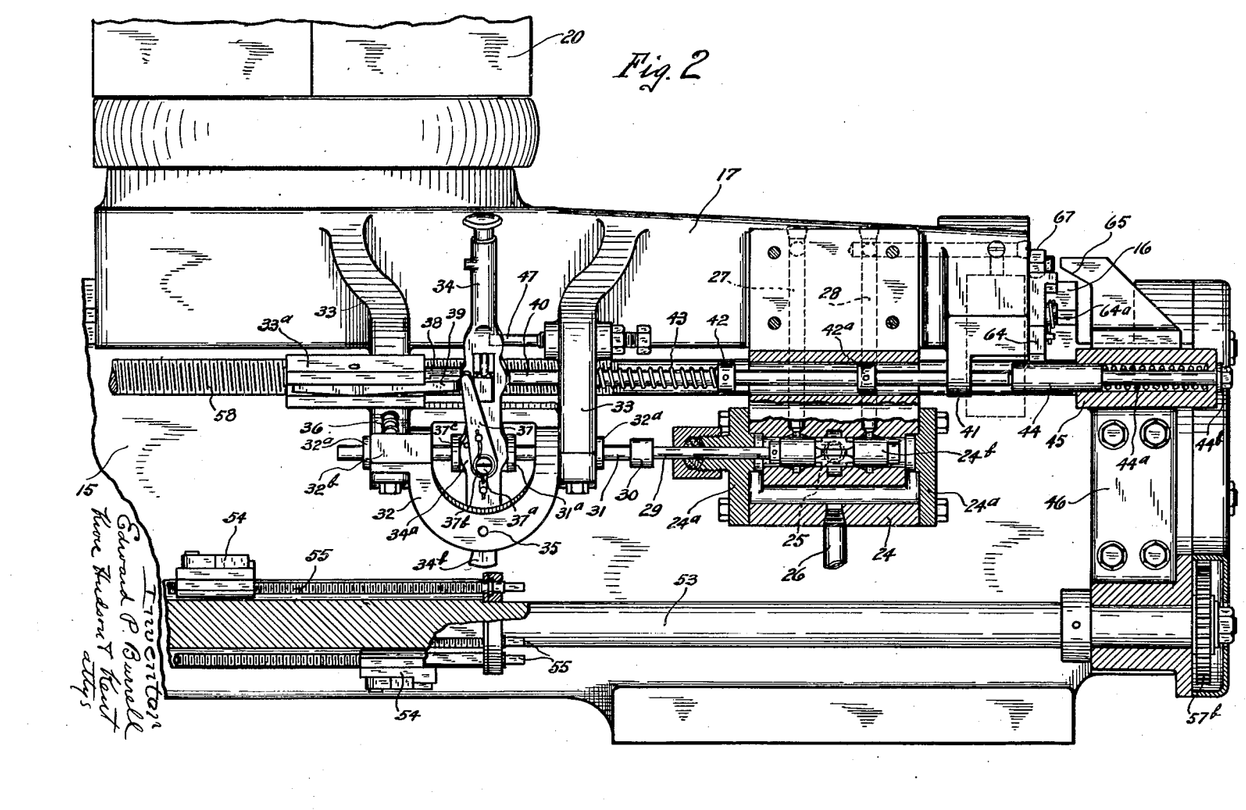
Fig. 2 is an enlarged side view of a portion of the lathe with parts in section.
Figure 3:
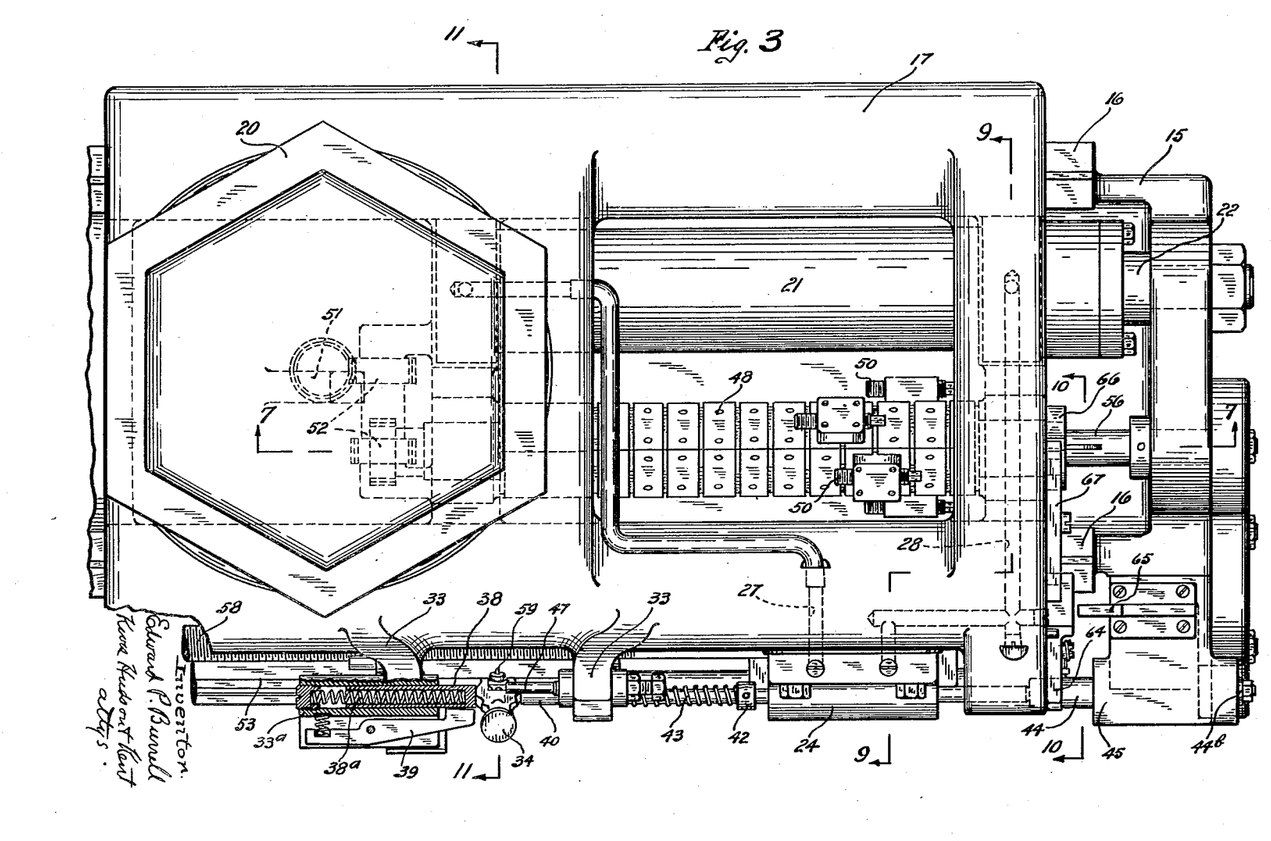
Fig. 3 is a top plan view of the same.

In this instance, the cylinder 21 and the piston and piston rod 22 which actuate the turret slide 17 are mounted in the bed 15, note particularly Figs. 3, 9, 11 and 12. For convenience, the cylinder 21 is attached in any suitable manner to the lower side of the turret slide and the piston and piston rod are stationary, Fig. 3 showing the end of the piston rod 22 suitably secured in the rear end of the bed 15. The actuating fluid is supplied to the cylinder on opposite sides of the piston through the medium of a valve including a valve chamber 24 which, in this instance, is secured to and moves with the slide 17, and being secured thereto at the front side of the machine. Fluid is supplied under suitable pressure from the pump, not shown, by a pipe 25 and is exhausted from the valve chamber by a pipe 26 (see Fig. 9). These pipes 25 and 26 in this instance are flexible so as to admit of relative movement between the valve and pump which may be located at any suitable point. The valve chamber has delivery connections with opposite ends of the cylinder, one being designated generally by the reference character 27 and the other by the reference character 28, (see Figs. 2 and 3). These connections may be formed wholly or in part by drilled passageways or wholly or in part by piping. For convenience, both methods are utilized. As these connections may be established in any suitable way, further details thereof need not be explained, and it will be sufficient to state that to cause a forward travel of the slide 17 the actuating fluid is delivered from the valve chamber by way of the connection 27 to the forward end of the cylinder 21, and is exhausted from the rear end of the cylinder by way of the connection 28, and when the slide is returned or moved rearward, the actuating fluid is supplied by way of connection 28 and exhausted by connection 27.

The valve chamber consists of a main body in which a cylindrical bore is formed for the movable valve member, the ends of the bore being closed by end plates 24a, one having a suitable stuffing box formed thereon. Slidable endwise in the bore of the valve chamber is a valve 24b which preferably has two cylindrical end portions connected by a reduced skeleton portion, the cylindrical portions being adapted to cover and uncover ports located at the lower ends of the delivery and exhaust connections 27 and 28, see particularly Fig. 2. This valve member, which is designed to have endwise horizontal movement in the chamber, has connected to it a valve rod 29 which extends through the stuffing box referred to, the forward end of which is, in this instance, connected by a coupling 30 to a rod 31 which extends through two aligned bosses 32a of a rocking member 32 journaled for rocking movement in arms 33 formed on the slide 17. The portion of the rocking member 32 below the bosses 32a is substantially U-shaped and on the portion of the rod 31 between the arms of the U, the rod has an enlarged portion forming two spaced shoulders 31a which receive a somewhat enlarged portion 34a of a control lever 34. This lever, which is supported for rocking movement forwardly and rearwardly and for rocking movement laterally, is supported and connected for pivotal movement laterally by means of a bearing screw 35 to the lower part of the rocking member 32. The arrangement is such that as the lever is moved laterally an endwise movement is transmitted through the rod 31 and valve rod 29 to the valve 24b. Since the valve actuating rod 31 passes through the trunnion supports 32a of the rocking member 32, it will be obvious that the lever 34 and the rocking member 32 supporting it may be rocked inwardly and outwardly about the axis of the rod 31 and valve rod 29, this rocking movement having no effect on the valve 24b so far as endwise movement thereof is concerned. The valve may rock with the lever or the coupling 30 may be such that no rocking movement is imparted to it, depending upon the form of coupling used. As will be observed from numerous figures of the drawings, the lever 34 is biased toward its outer position by means of a spring 36 here shown as a coil spring seated in sockets formed in an extension 32b of the rocking member 32 and in the lower portion of one of the arms 33 (see Figs. 2 and 14). Accordingly, when the lever 34 is rocked inwardly toward the slide 17 and bed 15, this spring 36 is compressed, and when the lever is released, the spring will throw the lever to its outward position against a suitable stop which limits the outward movement, such as indicated at 34d in Figs. 11 and 14.

Figure 1:
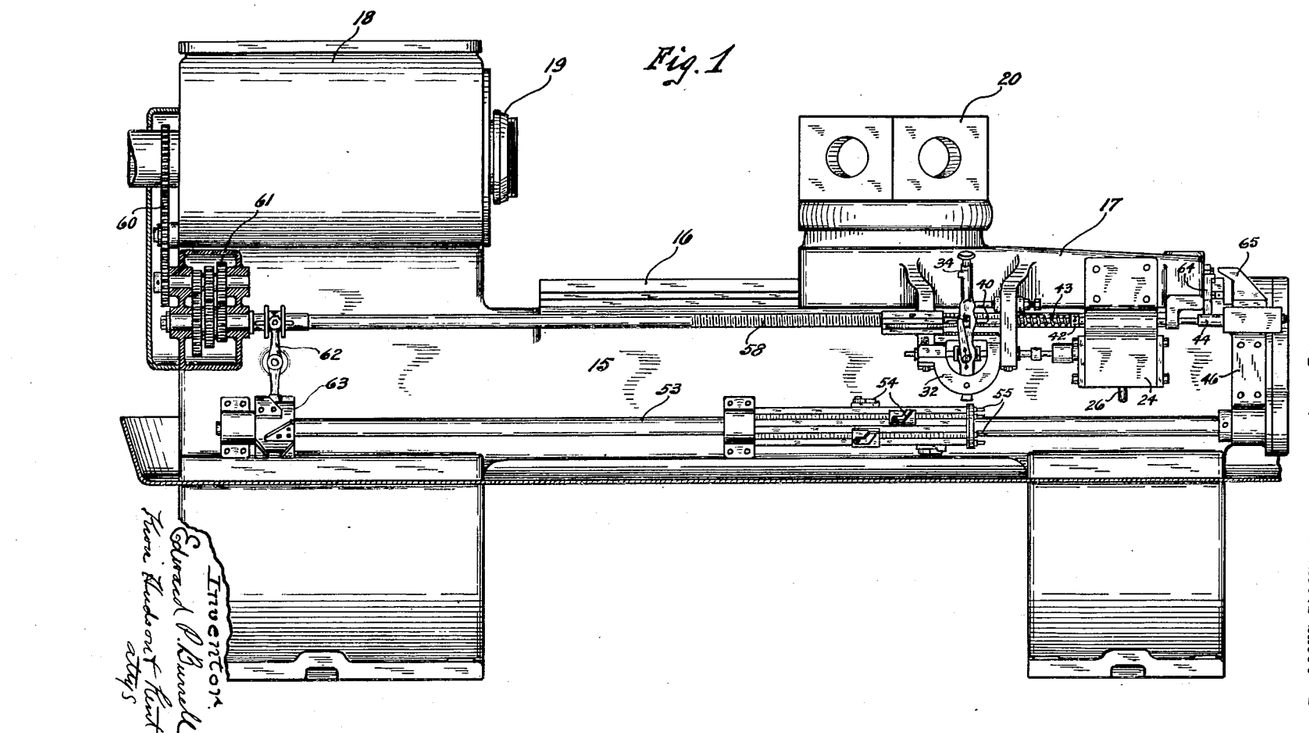
Fig. 1 is a side view of a turret lathe having my control system applied thereto.

It will be observed further that the lever 34 carries a dog 37 pivoted to the outer face of the lever near the enlargement 34a by means of a pivot screw or other member 37a, a suitable spring 37b being provided to hold this dog against a stop 37c when other parts, to be referred to presently, permit the dog to be moved by this spring toward the left, as viewed in Figs. 1 and 2 and other figures.

Parts for automatically actuating the lever at different points in the cycle of operations are arranged on opposite sides of the lever. One of these parts consists of a spring-pressed pin 38 movable in a socket formed in an enlargement 33a of one of the arms 33, see particularly Fig. 3. This pin is normally moved by its associated spring 38a so as to engage the lever, but at times it is held in its retracted position out of engagement with the lever by a pivoted catch 39 also mounted in the enlargement 33a of one of the arms 33. This catch is so spring actuated that when the pin 38 is pushed inward, the free end of the catch tends to drop in behind the forward end of the pin so as to hold the pin in its retracted position, (see Fig. 5).

On the opposite side of the lever 34 and substantially in line with the spring-pressed pin 38 is a rod 40 which is carried in part by one of the arms 33 and by an extension 41 near the rear end of the slide 17. This rod 40 and the spring-pressed pin 38 are adapted to move horizontally, as will be apparent from the drawings. This rod 40 is provided with two collars 42 and 42a. Between one of these collars 42 and the adjacent arm 33 of the slide is a light spring 43, this spring urging the rod 40 at all times in a right-hand direction, as viewed in Figs. 1 and 2 and other figures. The movement in the right-hand direction is limited by the engagement of the collar 42a with the extension 41 of the slide, this position being shown in Fig. 5. In line with the rod 40 is a plunger 44 mounted in a boss 45 on a stationary part, in this instance a bracket 46 which is bolted to the bed near its rear end. In the boss is a relatively strong spring 44a which tends to move the plunger 44 outwardly or to the left as the same is viewed in Fig. 2 and other figures, its movement in this direction being limited by a shoulder which may be in the form of a washer 44b at the reduced end of the plunger on the outer side of the boss 45. As stated above, the spring 44a is relatively strong and, in fact, it is stronger than the combined strength of the springs 38a and 43 associated respectively with the pin 38 and rod 40.

The functioning of the spring-pressed pin 38 on one side of the lever, of the rod 40 on the opposite side of the lever, and of the spring-pressed plunger 44, as well as the action of the dog 37 and catch 39, will be explained presently.

Before describing some of the other operating parts more remote from the lever 34, it might be mentioned that there is supported by one of the arms 33 a lever holding member 47 which may be referred to as a dwell pin, this pin being so located that when the lever is in its neutral position, it stands in front of this pin, as shown in Fig. 2, but when the lever has been moved to the left and then rocked inward in a manner hereinafter explained, it passes behind the plane of this pin and when the lever is rocked laterally toward its central position it will come behind a portion of the pin which will then restrain its outward swinging movement for a purpose to be explained, (see Fig. 5). This pin is horizontally disposed and is preferably adjustable so that the length of time that the lever is restrained from outward movement under the action of spring 36 may be adjusted.

Turret lathes are usually provided with what is known as a stop roll having a series of adjustable stops to limit the forward travel of the turret lathe to terminate the feeding movement of each cycle of cutting operations. This means that there is provided on the circumference or outer surface of the stop roll a series of stops, one for each face of the turret, these stops being adjustable longitudinally of the stop roll. A stop roll of this general character is preferably here employed, the one illustrated, see particularly Figs. 7 and 11, being in the form of a hexagonal shaft 48 (there being as many faces to this stop roll as there are faces on the turret). This stop roll is rotatably supported by the slide 17 in bearings 49 (see Fig. 7), the stop roll being in this instance located between the ways of the bed alongside the cylinder 21. Secured to each face of the stop roll and adjustable therealong is a stop member 50, and on the forward travel of the slide, one of these stops 50 comes in contact with a stationary stop 51 on the bed, see Fig. 11. This stop roll is given a step-by-step rotative movement with the indexing of the turret, so as to bring a different stop 50 in line with the stationary stop 51 at the completion of each indexing movement. The stop roll may be operated by the turret by any suitable form of gearing, but, in this instance, by a series of spiral gears designated generally by the reference character 52, see Figs. 7 and 11.

A member similar to the stop roll 48, and for convenience referred to as a cam roll 53, is mounted on the front face of the bed, as shown in Fig. 1 and other figures of the drawings, this cam roll carrying a plurality of adjustable cams 54 each mounted on a separate face of the cam roll and being adjustable lengthwise thereof by means of screws 55 which may be adjusted to independently vary the positions of these cams 54, the purpose of which is to actuate the lever 34 (see Fig. 11) to initiate the relatively slow or feeding movement of the slide, one cam performing this function for each cycle, and therefore for the tool or group of tools on each face of the turret. This cam roll 53 is actuated by the stop roll 48 and is given a step-by-step movement in timed relation with the similar movements imparted to the stop roll. The movements of the stop roll are conveyed to the cam roll by a shaft 56 which is supported on the bed so that the stop roll may slide relative thereto, but it is in keyed relation with the stop roll as indicated at 56a in Fig. 7, so that the shaft will turn with the stop roll. The outer end of this shaft is connected by three gears 57, 57a and 57b to the cam roll 53, this being a one-to-one ratio gearing so that the two rolls will turn in unison, see Figs. 2, 7 and 8.

Figures 5, 13:
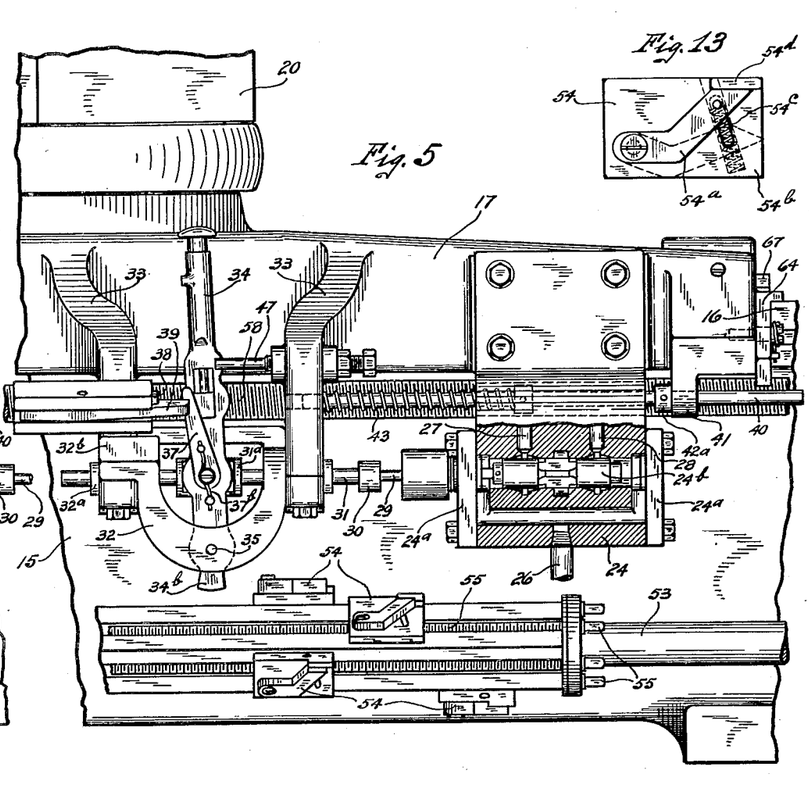
Fig. 5 is a similar view but showing more of the mechanism and with the control elements positioned differently than in either Figs. 2 or 4.
Fig. 13 is a detail plan view of one of the adjustable cams of a step-by-step rotated cam shaft utilized in controlling one phase of each of the cycles of movements of the reciprocating slide.
Figures 11, 12:
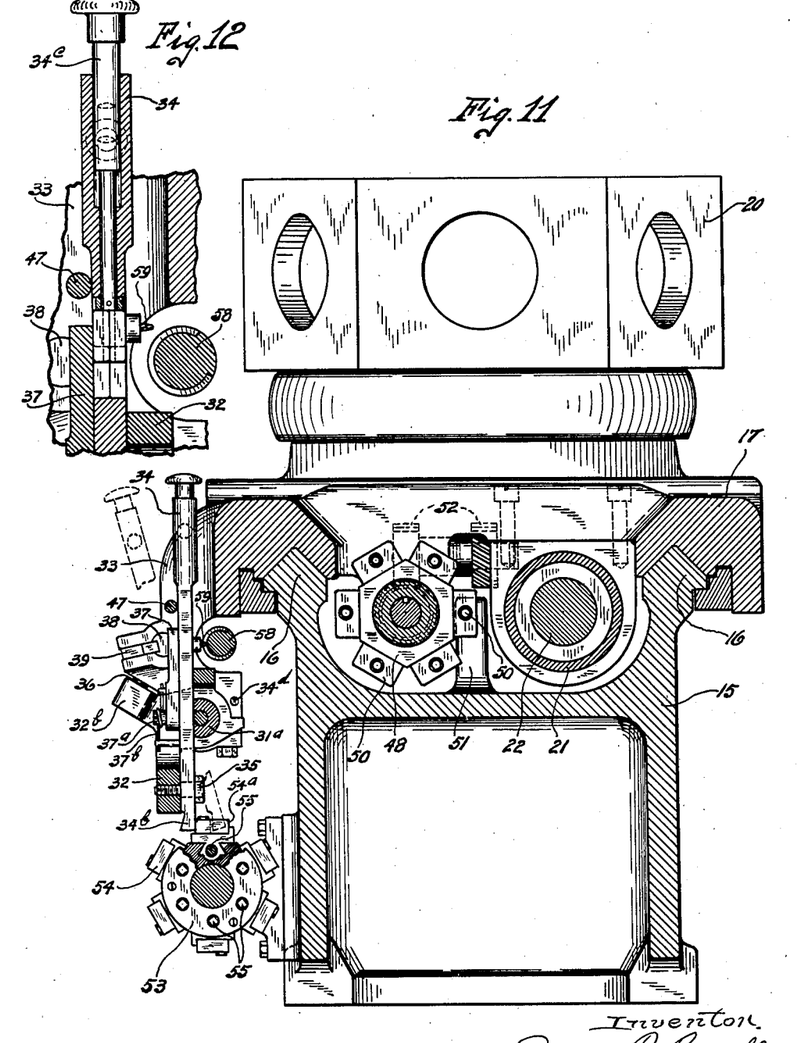
Fig. 11 is a sectional view substantially along the line 11—11 of Fig. 3, but with part of the control member arranged as in Fig. 5.
Fig. 12 is a sectional view taken through the control lever of Fig. 11, but showing the parts on an enlarged scale, with some of the parts differently positioned than in Fig. 11.

In Figs. 11 and 13 I have shown the form or construction of the cam 54 which I prefer to employ. It will be observed from this figure that each cam 54 includes a pivoted cam member 54a which is mounted on a supporting block 54b which has a downwardly projecting wedge-shaped extension fitting into a correspondingly shaped groove of the cam roll, this portion having a threaded opening engaging one of the screws 55 by which the cam members may be adjusted longitudinally of the cam roll. The pivoted cam 54a is angularly shaped, as here shown, and is held by a suitable spring 54c into engagement with a stop 54d on the block 54b. The purpose of each of the cams 54 is to cam the upper part of the lever inwardly or to rock the lever 34 from the position shown in Fig. 14 to the position shown in Fig. 11. As previously explained, when this occurs the lever 34 and the lever supporting member 32 rock about the trunnions 32a of the latter. In order that the lever may thus be rocked inwardly by the cams 54, it is only necessary to provide on the lever 34 or rocking member 32 a suitable projection here constituting the lower end of the lever 34 and designated 34b, which projection is so located with respect to the cam which is uppermost on the cam roll that when the slide is moving forwardly and, of course, carrying with it the lever 34 and associated parts, the projection 34b will ride up onto the cam face of the cam member 54a and produce the desired inward rocking movement. Each cam member 54a is in the form of a pivoted member so that on the return movement of the slide 17, lever 34 and associated parts, no camming action will be produced by this cam member, the projection 34b of the lever then simply contacting with the cam member swinging it outward as indicated by dotted lines and then passing by it, the spring 54c then moving the cam member back against the stop 54d.

When the lever is thus cammed inwardly, as just explained, a part of the lever comes into engagement with a suitable device which is preferably actuated mechanically at a predetermined speed, and the function of which is to act on the lever and, therefore, the valve to keep the relatively slow or feeding motion of the slide constant. As here shown, the device referred to is a rotating screw 58 which may be driven from the work spindle 19, as hereinafter described, and the part of the lever which moves into engagement with the screw when the lever is shifted inwardly by the cam member 54a is a pin 59 which is carried by the inner face of the lever, as clearly shown in Figs. 11, 12 and 14. The screw 58, which is supported in a horizontal position along the front side of the bed 15, being suitably held against endwise movement, is preferably driven at a predetermined speed in predetermined relation to the rotation of the work spindle 19. It is not essential to my invention that the speed of the screw 58 be changed with relation to the speed of the work spindle, but in Fig. 1 I have shown the screw driven from the work spindle by a train of gears 60 and a suitable gear cone 61 having provision for any desired number of speed changes. In this instance, the cone includes three sets of gears providing for three speeds relative to the speed of the work spindle. This gear cone includes three gears which are rotatably mounted on the screw 58 and any one of these three gears may be clutched to the screw by means of a sliding key or equivalent device which is moved from one gear to the other by a shifter 62, in this instance controlled by a cam drum 63 located on the shaft of the cam roll 53. This speed changing mechanism is utilized, however, only when it is desired that the relatively slow movement (or the feeding movement when the invention is applied to a lathe), for one or more cycles of the series is to be altered with respect to the relatively slow movement in other cycles. For highest efficiency, this feature is desirable in certain kinds of lathe work.

Figure 10:
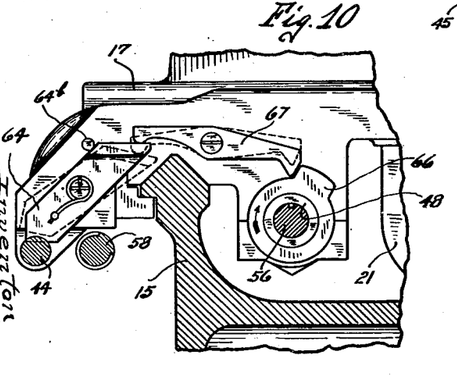
Fig. 10 is a transverse sectional view substantially along the line 10—10 of Fig. 3.

There are yet to be explained, before describing the full sequence of operations, a few parts which are located at the rear end of the slide and rear end of the bed and necessary for the proper functioning of the mechanism. One of these parts is a pivoted latch 64 which is pivoted at 64a on the rear end of the slide, note particularly Figs. 8 and 10, a suitable spring normally holding this latch up against a stop 64b in the full line position shown in Fig. 10. The lower outer end of this latch is adapted to drop in front of the spring plunger 44 when the slide moves forwardly so that on the return movement of the slide the latch will push the plunger 44 inward against the spring 44a, as illustrated at the righthand side of Fig. 6. The upper end of the latch is adapted to engage a stationary cam 65 which is mounted on the rear end of the bed, this cam being shown in Figs. 1, 2, 3, 6 and 8. The function of this cam is to engage the upper end of the latch 64 when the slide is adjacent the end of its return movement so as to withdraw the lower end of the latch from in front of the plunger 44 and thereby permit the latter to spring forward and shift the lever 34 and valve in a manner to be explained, this occurring when the cycles of operation are to be repeated for a given number of times or for an indefinite number of times without bringing the mechanism to a stop.

When the invention is applied for certain uses, as, for example, for actuating the turret slide of a turret lathe, it is desirable that the movement of the slide be stopped after a given number of cycles, in this instance six cycles since the turret has six tool supporting faces, in order that the completed work piece may be unloaded from the work holder, generally in the form of a chuck, and a new work piece loaded therein. To accomplish this, I provide a cam 66, see particularly Fig. 10, which is mounted on an extension at the rear end of the stop roll 48 at the rear side of the slide 17. The cam is designed to engage a lever 67 supported on the rear end of the slide 17 and having a forward end which near the completion of the predetermined number of cycles through which the mechanism is to pass before it is brought to a stop is adapted to engage and depress the upper end of the latch 64 (see dotted line position in Fig. 10), this lever operating near the end of the final cycle of the series in place of the fixed cam 65 which operates at the end of the other cycles, so as to prevent the latch 64 from dropping in front of the plunger 44 and thus preventing the inward movement of the plunger and compression of the spring 44a and the subsequent reactuation of the lever and valve for the next cycle.

Figure 4:
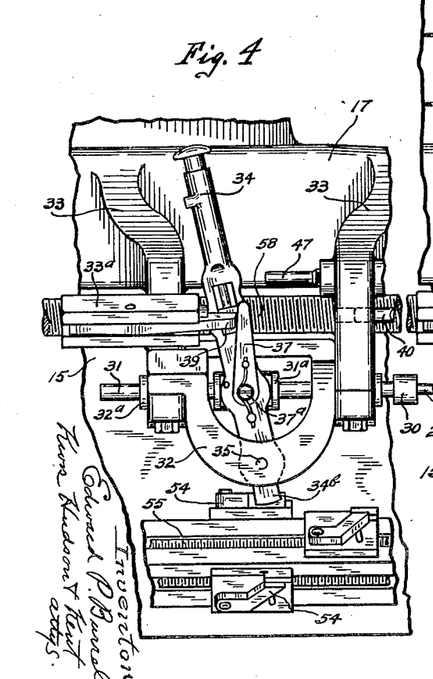
Fig. 4 is a portion of the lathe and a portion of the control system, viewed as in Fig. 2, but with some of the control members in a different position than illustrated in Fig. 2.
Figures 7, 14:
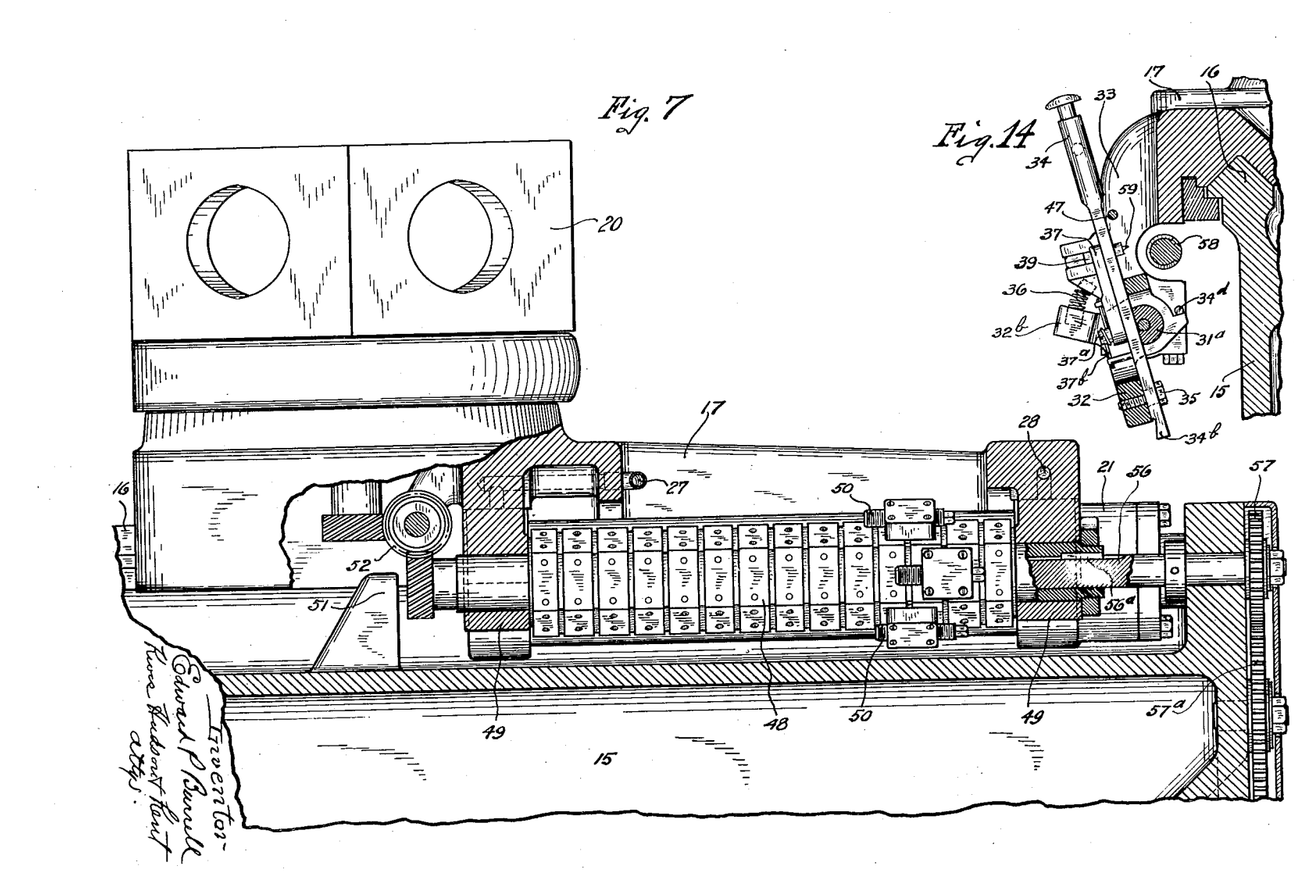
Fig. 7 is a longitudinal sectional view substantially along the line 7—7 of Fig. 3.
Fig. 14 is a view similar to a portion of Fig. 11 but with the control arranged as indicated by the dotted lines of Fig. 11.
Figure 8:
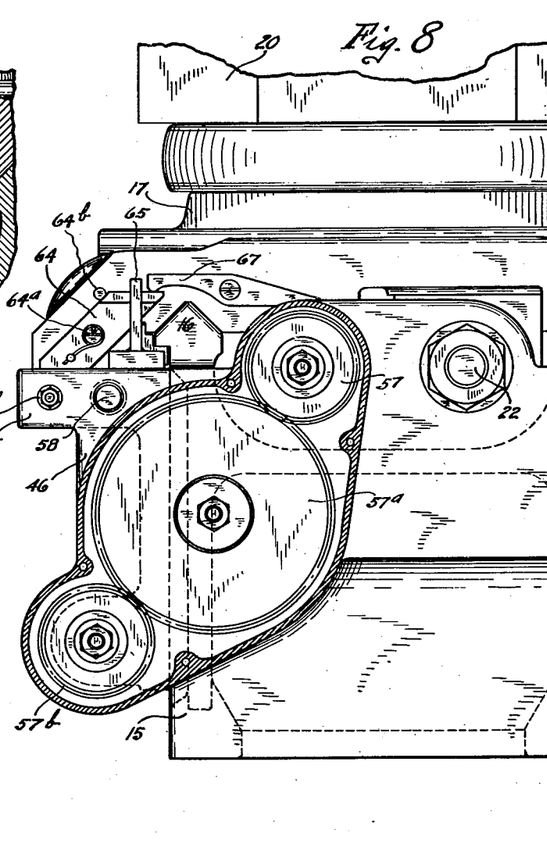
Fig. 8 is an end view of the lathe with part of the guard for certain gears removed.
Figure 9:
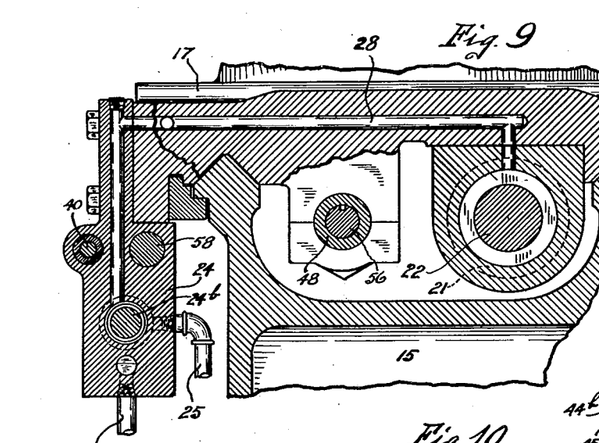
Fig. 9 is a transverse sectional view substantially along the irregular line 9—9 of Fig. 3.

The operation is as follows: When the machine is idle, all parts stand as shown in Fig. 2. The lever 34 is now in neutral position, i. e., in mid-position so far as lateral swinging movement is concerned, and it stands in its outer position part way in front of the dwell pin 47, as shown in Figs. 2 and 14. The valve is, of course, in its neutral or middle position, closing both of the ports at the lower ends of the connections 27 and 28 and the slide 17 is at the rear of the bed. To start the machine in operation, the operator manually swings the lever 34 to the left. In so doing, the spring pressed pin 38 is pushed inward and the end of the catch 39 drops in front of the forward end of this pin, as shown in Fig. 4. This, of course, moves the valve 24b to the left its maximum amount, allowing fluid to pass from the supply pipe 25 and through the connection 27 to the forward end of the cylinder 21. The slide now moves forwardly at its rapid rate and when it reaches a given position, when the tool or tools carried by the forward face of the turret are nearly up to the work piece, one of the cams 54 engages the projection 34b at the lower end of the lever 34 and rocks the lever inwardly. In Fig. 4 the cam and lever are shown in position such that the cam is in the act of swinging the lever inwardly. The inward swinging of the lever brings the pin 59 into engagement with the screw 58. The slide being yet in quick motion, the lower part of the lever is moved forwardly at a more rapid rate than the pin 59 is permitted to travel forward by its engagement with the screw. This then moves the lever to upright position or to substantially that position. This lateral movement of the lever by its engagement with the screw brings the lever behind the dwell pin 47, and this same motion of the lever moves the valve to the right to substantially the position shown in Fig. 5, thus nearly closing the ports and therefore the flow of actuating fluid. This causes the slide to be slowed down to its predetermined relatively slow speed, and for the balance of its forward movement, it continues at this speed, which is maintained constant by the action of the screw on the lever, for, should a change in the rate of leakage or any other cause tend to slow down the movement of the slide, the screw moves the lever to the left, thus increasing the port opening and flow of fluid, and should the resistance against movement of the slide tend to accelerate its motion, the increased movement would tend to move the lower end of the lever to the left, and this would, in effect, move the valve to the right and reduce the size of the port openings and the flow of actuating fluid. By this action, the pin 59 of the lever, by its engagement with the screw, serves in effect as a pivot for the lever, and theoretically at least, causes a slight constant back and forth motion of the lever and valve if these slight changes in speed occur, but in effect the regulating action is so sensitive that the slide is, in fact, maintained for all intents and purposes at a constant slow rate of movement. This rate of movement can, of course, be varied by increasing or decreasing the rate of rotation of the screw 58, which change can be accomplished either manually, or automatically as herein described.

When the apparatus is initially started by the manual movement of the lever 34 to the left, as previously explained, the dog 37 engages the end of the catch 39, as illustrated in Fig. 4, and when the lever 34 is cammed inwardly by the cam member 54, as also explained, the dog moves behind the end of the catch, as shown in Fig. 5, and it remains behind it throughout the relatively slow movement.

The relatively slow forward movement of the slide continues until one of the stops 50 of the stop 48 engages the stationary stop 51 of the bed, but inasmuch as the screw 58 continues its rotation, the lever is moved to the left for a distance until it passes from behind the dwell pin, and when it passes from behind the dwell pin the spring 36 throws the lever 34 outwardly, the parts now rocking about the trunnions 32a. This outward movement causes the dog 37 to engage and swing the catch 39 outwardly and to release the spring pressed pin 38, which immediately, under the action of its associated spring 38a, swings the lever laterally to the right, as shown in Fig. 6, thus moving the valve to the extreme right, causing the fluid to be introduced to the rear end of the cylinder and exhausted from the front end and producing the rapid return of the slide.

It was mentioned that when the slide reached the end of its relatively slow forward motion the lever was gradually moved to the left until it came clear of the dwell pin. This, when the invention is applied to a machine tool such as a turret lathe, is an important feature for the reason that it is generally desirable, when a tool completes its cut at the end of the forward movement of the slide, that it remain for a period in its forwardmost position until all the spring has been taken out of the tool and its supporting means, after which the return movement of the tool and slide can be started. This period is known as the dwell which, with the present construction, can be made anything desired, i. e., can be given any length of time desired, by adjusting the dwell pin which is here shown in the form of a screw. The dwell is terminated or completed when the lever passes beyond the forward end of the dwell pin and is permitted to then rock forwardly.

Figure 6:
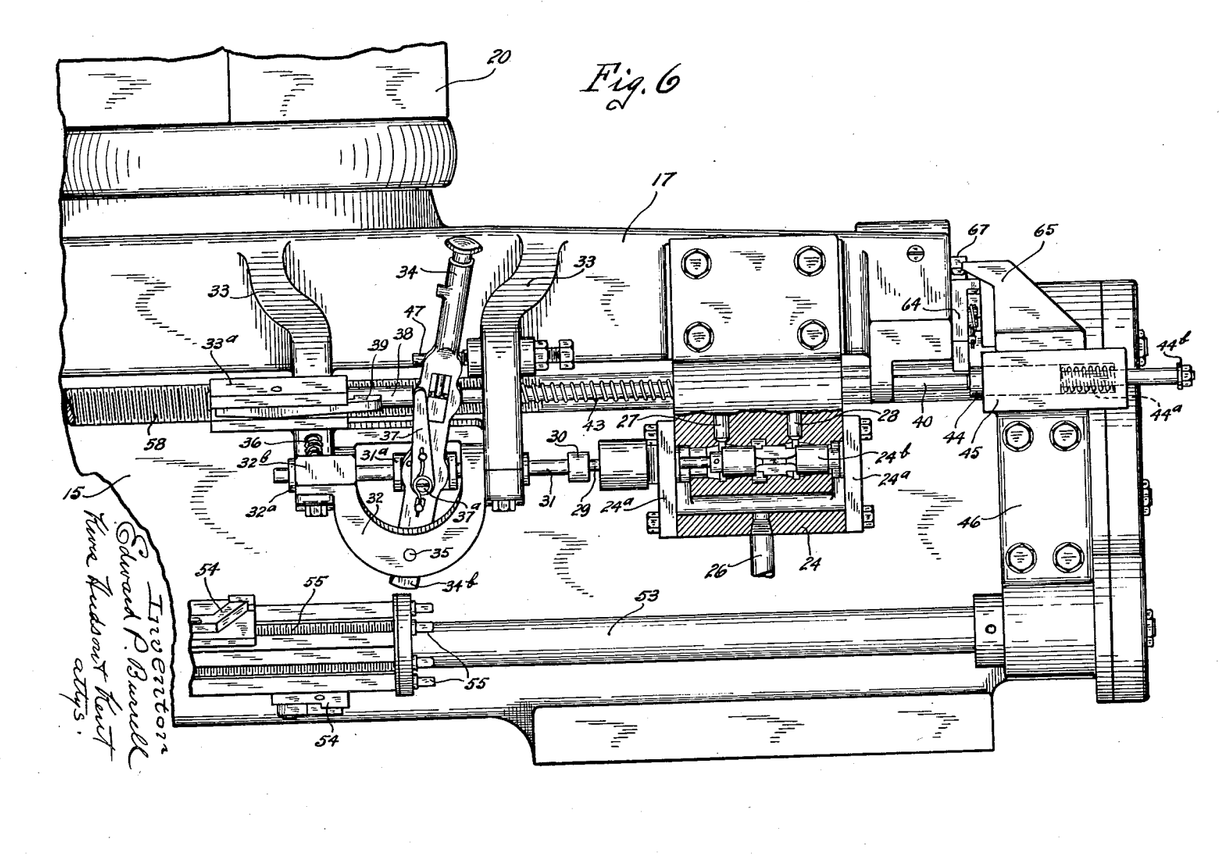
Fig. 6 is a view similar to Fig. 2, with some of the control elements in still different positions than illustrated in the preceding figures.

When the relatively rapid return movement is initiated by the movement of the lever 34 to its righthand position as shown in Fig. 6, this movement of the lever is not affected at all either by the spring 44a cooperating with the spring plunger 44 or by the spring 43 associated with the rod 40, the forward end of the rod 40 at such time being in substantially the position shown in Fig. 5 in so far as the slide is concerned. When the rapid return movement of the slide is initiated, the rod 40 stands with relation to the slide, as shown in Fig. 5, with its collar 42a in engagement with the extension 41 of the slide since the spring 43 has moved it to that position. As the slide moves rearwardly, it carries with it the rod 40 and near the end of the rearward movement of the slide, the rear end of the rod 40 engages the forward end of the plunger 44 and then stands stationary until the forward end of the rod 40 adjacent the lever engages the lever, as shown in Fig. 6. The length of rod 40 may be such as to move the lever 34 slightly at this point to slow down the rapid movement of the slide to facilitate the indexing of the turret and locking by the usual lock bolt. At that instant the latch 64, whose lower end was below or in the path of the spring plunger 44, engages the end of the plunger and moves it rearwardly compressing the spring 44a and the rearward movement of the slide and the compression of the spring 44a will continue until the stationary cam 65 cams the pivoted latch 64 so that its lower end is moved out from in front of the spring plunger 44, thus releasing it and allowing the plunger through the rod 40 to push the lever 34 from the position shown in Fig. 6 to the position shown in Fig. 4, the latter being the position for the rapid forward motion. The lever, in moving from the position of Fig. 6 to the position of Fig. 4, is given a lateral swinging movement of a predetermined amount because the rod 40 maintains a fixed distance between the forward end of the plunger 44 and the lever and the forward movement of the plunger 44 is of a definite amount since its forward movement is stopped by the abutment 44b, see Fig. 2. During this movement of the spring plunger 44, rod 40 and lever 34, the relatively light spring 43 is compressed and the spring 38a of the spring pin 38 is compressed, and when this occurs, the forward end of the catch again drops in front of the spring pin 38 and the slide will travel forward in quick motion and, in fact, the whole cycle of movements will be repeated.

Near the end of the rapid return movement of the slide the turret is indexed and both the stop roll and the cam roll are turned or revolved one step, and this, of course, brings into effect a new stop on the stop roll for stopping the forward movement of the slide, and brings into effect a new cam on the cam roll, which determines the point at which the relatively slow or feeding movement is initiated, and, if desired, the movement of the cam roll may cause a change in the gears which control the rate of movement of the screw so that for a second or, in fact, for any succeeding cycle until the whole series is completed, the screw may be rotated at such speed with relation to the work spindle that any desired relatively slow or feeding movement may be obtained.

These cycles of movement may be continued indefinitely, depending upon the particular use of this hydraulic mechanism or on the type of apparatus with which it is used, but when it is applied to a turret lathe, as already stated, it may be desirable that the movement of the slide be stopped after the completion of a predetermined number of cycles, which, in this instance or with a turret having six faces, would be six in number for unloading and loading purposes, as explained. Accordingly, with the mechanism herein illustrated, when the last cycle of the series is substantially completed, the cam 66 and lever 67 become effective to rock the latch 64 so as to elevate its lower end and prevent the latch from engaging the forward end of the plunger 44 and compressing the spring 44a, which occurred at the end of each of the preceding cycles of the series. Therefore, at the end of the last cycle of the series, since the latch 64 is not effective to move the plunger rearwardly and compress the spring 44a, the plunger, due to the strength of the spring 44a, acts as a solid abutment and the rod 40, being between the forward end of this plunger and the lever 34, will, as the rearward travel of the slide approaches its end, gradually move the lever 34 from the position of Fig. 6 to the position of Fig. 2, which is the neutral position of the lever, and this brings the valve 24b to its middle position, stopping entirely the flow of motive fluid and bringing the whole apparatus to a stop. It might be here stated that the cam 66 and the inner end of the lever 67 are so designed that at the end of the indexing movement and just before the slide reaches the end of its rearward movement the latch is released from the cam and the action of the lever 67 on the latch 64 is terminated or is no longer influenced by the lever so that the latch may swing to its normal position and in fact comes to rest on top of the spring plunger 44 so that all parts are again in position for initiating the next series of cycles of movement.

In the operation of machine tools, such as turret lathes, it is very often desired that the automatic feed of the tools be stopped after initiation of the cutting operation and that the tool be caused to move back for test or gauging purposes, and, in this instance, this would involve the manual manipulation of the lever 34, i. e., the manual lateral swinging of the lever so as to shift the valve 24b manually and control the starting, stopping and movement of the slide in either direction. This would not be possible with the pin 59 in engagement with the screw as the lever is at such time behind the dwell pin and it cannot be rocked forwardly so as to disengage the pin 59 from the screw and of course cannot be rocked laterally as long as the pin engages the screw. To make this manual control possible, I prefer to provide a special construction for the lever 34 by making the lever in two parts with the part here designated 34c telescopically arranged with respect to the main part of the lever, this part 34c being the part carrying the pin 59, the arrangement being such that the part 34c may be elevated so as to disengage the pin 59 from the screw and thus make it possible to stop the feeding motion and to cause the slide to be moved rearwardly and then forwardly if desired by the manual manipulation of the lever. As soon as the part 34c is lowered, the pin 59 will re-engage the screw and again start the feeding motion. It might be noted in passing that the direction of rotation of the screw is as indicated by the arrow in Fig. 11, this direction of rotation being such that there is no tendency for the action of the screw to lift the pin 59 out of engagement therewith. If desired, a detent or so-called spring point may be provided to retain the part 34c of the lever either in its elevated or normal lowered position.

It will thus be seen that I have provided a hydraulic control system having all of the advantages and attaining the objects enumerated in the early part of the specification. The automatic control of the sliding member is such as to admirably adapt it for machine tool work, but nevertheless, as already pointed out, part or all the features of the invention may be used to advantage with other types of machines and apparatus entirely, and I therefore neither wish to be confined to the particular application of my invention herein illustrated and described nor to the specific details of construction and arrangement illustrated and described since modifications may be made therein without departing from the spirit and scope of the invention.

Having thus described my invention, I claim:

1. The combination with a member to be moved, of hydraulic means for actuating said member including a source of fluid supply and a valve, and automatic valve shifting means acting on the valve during a portion of the movement of said member to maintain a substantially constant motion for said member irrespective of the leakage factor, and means for automatically actuating the valve to cause the hydraulic means to move said member at different rates.

2. The combination with a member to be moved, of hydraulic means for actuating it, including a source of fluid supply, a valve, a valve lever connected therewith, automatic valve shifting means carried in part by the lever and acting on said lever during a portion of the movement of said member to maintain said member in substantially constant uniform motion irrespective of variations in leakage, and automatic means acting on said lever to shift the valve and cause said hydraulic means to vary the rate of movement of said member, said lever constituting also means for manually controlling said hydraulic means.

3. The combination with a member to be moved, of hydraulic means for actuating it including a source of fluid supply and a valve, automatic valve shifting means acting on the valve during a portion of the movement of said member to vary the supply of motive fluid to maintain a constant motion for the movable member irrespective of leakage conditions, additional automatic means acting on the valve to vary the supply of motive fluid to change the rate of movement of the movable member, and automatic means acting on said valve for reversing the movement of said member.

4. In combination, a member to be actuated, hydraulic means for moving it including a source of fluid supply, a valve, a valve lever connected to the valve, automatic valve shifting means acting on the lever during a portion of the movement of said member to vary the supply of motive fluid to maintain a constant motion of said member, automatic means acting on said lever to vary the fluid supply to cause said member to move at a different rate during another portion of its movement, and automatic means acting on said lever for reversing the movement of said member.

5. In combination with a member movable in opposite directions, hydraulic means for actuating it including a source of fluid supply, a valve, automatic valve shifting means acting on the valve during a portion of the movement of said member to maintain a constant motion for said member to neutralize varying leakage conditions, and automatic means acting on the valve to stop the movement of said member after it has passed through a predetermined movement.

6. In combination with a member movable in opposite directions, hydraulic means for actuating it including a source of fluid supply, a valve, automatic valve shifting means acting on the valve during a portion of the movement of said member to maintain a constant motion for said member to neutralize varying leakage conditions, and automatic means acting on the valve to vary the rate of movement of said member in a given direction during different movements.

7. In combination with a reciprocating slide, hydraulic means for actuating it including a source of fluid supply, a valve, automatic valve shifting means acting on the valve during a portion of the movement of said slide to cause said member to have a constant motion irrespective of leakage, and automatic means acting on the valve to reverse its direction of movement.

8. In combination with a reciprocating slide, hydraulic means for actuating it including a source of fluid supply, a valve, automatic valve shifting means acting on the valve during a portion of the movement of said slide to cause said slide to have a constant motion irrespective of leakage, automatic means for acting on the valve to reverse the direction of movement of the slide, and adjustable means for varying the time interval between its movement in opposite directions.

9. In combination with a slide, hydraulic means for actuating it including a source of fluid supply, a valve, a valve lever, automatic mechanical valve shifting means acting on said lever during a portion of the movement of the slide to insure movement of said slide at a constant rate, and other mechanical valve shifting means acting automatically on said lever to vary the rate of movement of said slide and its direction of movement.

10. In combination with a slide, hydraulic means for actuating it including a source of fluid supply, a valve, a valve lever, automatic mechanical valve shifting means acting on said lever during a portion of the movement of the slide to insure movement of said slide at a constant rate, other mechanical valve shifting means acting automatically on said lever to vary the rate of movement of said slide and its direction of movement, and additional means for causing said lever to be actuated to stop the movement of the slide after predetermined movement.

11. In a machine tool, a bed, a slide movable back and forth along the bed, hydraulic means for actuating the slide including a motor, a source of fluid supply, valve means for controlling the supply of fluid to the motor, automatic valve shifting means acting on the valve means during a portion of the movement of the slide to automatically insure a constant feed movement of the slide regardless of leakage, and automatic valve shifting means acting on the valve means to give the slide a relatively high speed movement.

12. In a machine tool, a bed, a work holder and a tool holder, one being in the form of a slide movable toward and from the other, hydraulic means for actuating the slide including a motor, a source of fluid supply, valve means, automatic valve shifting means acting on the valve means during a portion of the movement of the slide to insure a substantially constant feeding motion to the slide irrespective of leakage, and other automatic valve shifting means acting on the valve means to stop, start and vary the rate of movement of the slide.

13. In a machine tool, a work holder and a tool holder, one movable toward and from the other, hydraulic means for actuating said movable member including a motor, a source of fluid supply, and valve means, means operating in predetermined timed relation with the work holder and acting automatically on said valve means during a portion of the movement of said movable member to insure a constant motion for said member irrespective of leakage, and automatic means acting on the valve means to control the direction of movement and to vary the rate of movement of said movable member.

14. In combination with a lathe having a rotary work spindle and a tool holding slide, hydraulic means for actuating the slide including a motor having one element connected to the slide, a source of fluid supply, and valve means, a member operated in predetermined timed relation with the work spindle, and a second member engageable therewith and acting on the valve means to automatically shift the same during a portion of the movement of the slide to insure a constant feeding motion of the slide irrespective of leakage, and automatic means for causing engagement and disengagement of said members.

15. In combination with a lathe having a rotary work spindle and a tool holding slide, hydraulic means for actuating the slide including a motor having one element connected to the slide, a source of fluid supply, and valve means, a member operated in predetermined timed relation with the work spindle, a second member engageable therewith and acting on the valve means to insure a constant feeding movement of the slide irrespective of leakage, automatic means for causing engagement and disengagement of said members, and automatic means acting on the valve means for changing the rate of movement of the slide.

16. In combination with a lathe having a rotary work spindle and a tool holding slide, hydraulic means for actuating the slide including a motor having one element connected to the slide, a source of fluid supply, and valve means, a member operated in predetermined timed relation with the work spindle, a second member engageable therewith and acting on the valve means to insure a constant feeding movement of the slide irrespective of leakage, automatic means for causing engagement and disengagement of said members, automatic means acting on the valve means for changing the rate of movement of the slide, and means for stopping the movement of the slide after a predetermined movement.

17. In a machine tool, a movable member, a tool holding slide movable toward and from said movable member, hydraulic means for actuating the same, including a motor having one element connected to the slide, a source of fluid supply, a valve, a valve lever, valve shifting means operating in predetermined timed relation with respect to said movable member and acting on the valve during a portion of the movement of the slide to insure a constant feeding motion to the slide irrespective of leakage, automatic means for reversing the direction of movement of the slide and for causing a rapid return motion, and adjustable means for varying the dwell of the slide between the end of the feeding motion and the return motion.

18. In a machine tool, work and tool holding members one movable toward and from the other, hydraulic means for moving said member including a motor, a source of fluid supply, a valve, a valve lever connected thereto, means for insuring a constant feeding motion irrespective of leakage including a member moving in predetermined timed relation with respect to the work holding member, and a member on the lever engageable therewith, means for automatically causing the engagement and disengagement of said members, and means whereby said members may be disengaged manually whereby the lever may be actuated manually to cause the movable member of the machine tool to be actuated back and forth at will.

19. The combination with a member to be moved, of hydraulic means for actuating said member including a source of fluid supply, a valve, and means acting on the valve to maintain a constant motion for said member irrespective of the leakage factor, and means for automatically actuating the valve, said valve being movable with the said member relative to said first named means.

20. The combination with a member to be moved, of hydraulic means for actuating it, including a source of fluid supply, a valve, a valve lever connected therewith, means acting on said lever to maintain said member in substantially constant motion irrespective of variations in leakage, and automatic means acting on said lever to vary its rate of movement, the valve and the valve lever being movable with said hydraulically actuated member relative to said first named means.

21. In a machine tool, work and tool holding members, one movable toward and from the other, hydraulic means for moving said member including a motor, a source of fluid supply, a valve and valve lever connected thereto, means for insuring a constant feeding motion irrespective of leakage, including a member moving in predetermined timed relation with respect to the work holding member, means for stopping the movement of said hydraulically actuated member and for varying its rate of movement including a stop member movable with said movable member.

22. In combination, a movable member, a slide, hydraulic means for actuating the slide including a motor, a source of fluid supply, a valve, a valve lever connected thereto, means for insuring a constant feeding motion irrespective of leakage including a member moving in predetermined timed relation with respect to said member, means for stopping, reversing and varying the speed of the slide, said means including a cam member having one or more parts for actuating the lever and mounted so that the slide may move back and forth with respect to it.

23. The combination of a member supported for movement, a fluid pressure operated motor for moving said member, a valve for controlling the flow of fluid to said motor, automatic means for controlling said valve to change the rate of movement of said member, automatic means for controlling said valve during a portion of said movement to maintain a substantially constant rate, and means for changing the rate of said constant movement.

24. The combination of a member supported for movement, a fluid pressure operated motor for moving said member, a valve for controlling the flow of fluid to said motor, automatic means for controlling said valve to cause said member to move at relatively slow and rapid rates during portions of said movement, automatic means for controlling said valve to maintain a substantially constant velocity during the movement at one of said rates, and means for changing the velocity of one of said rates.

25. The combination of a member supported for movement, a fluid pressure operated motor for moving said member, a valve for controlling the flow of fluid to said motor, automatic means for controlling said valve to give said member a transverse and a feeding movement, automatic means for controlling said valve to give said member a substantially constant movement during said feeding movement, and automatic means for changing the rate of said feeding movement.

26. In combination, a movable member, a fluid pressure operated motor for moving said member, a valve for controlling the flow of fluid to said motor, means for actuating said valve to reverse the operation of said motor, a member for holding said means inoperative and carried by said movable member, and stationary cam means for releasing said second member.

27. In combination in a machine tool adapted to perform a series of successive working cycles, a fluid operated motor, a valve for controlling the flow of fluid to said motor, means for actuating said valve to reverse the operation of said motor, a member for holding said means inoperative, cam means for moving said member to release said means at the end of each cycle of operation, and cam means for rendering said member ineffective after a predetermined number of cycles.

28. In combination in a machine tool adapted to perform a series of successive working cycles, a support, a member carried thereby, a fluid pressure operated motor for moving said member relative to said support, a valve for controlling the flow of fluid to said motor, means for actuating said valve to change the direction of movement of said member, a member for holding said means inoperative, a cam means carried by said support for controlling said second member to release said valve actuating means at the end of each cycle, and a second cam means carried by said first member for rendering said first cam means ineffective a predetermined number of cycles.

29. In combination in a machine tool adapted to perform a series of successive working cycles, a support, a slide supported thereby, an indexible member supported by said slide, a fluid pressure operated motor for moving said slide, a valve for controlling the flow of fluid to said motor, means for controlling said valve to reverse the direction of movement of said slide, a member for holding said means inoperative, cam means carried by said support actuating said last mentioned member to release said means at the end of each cycle, and cam means carried by said slide and operatively connected to said first mentioned member for rendering said last mentioned member ineffective after a predetermined number of cycles.

30. In a machine tool, the combination of a frame, a movable member supported thereby, a fluid pressure actuated motor for moving said member, a rotatable member, a valve for controlling the flow of fluid to said motor, a control member connected to said valve and movable therewith, and automatic means operatively connecting said control member with said movable member and said rotatable member for controlling said valve whereby said movable member is moved in predetermined relation to the movement of said rotatable member.

31. In a machine tool, the combination of a frame, a plurality of movable members supported by said frame, a fluid pressure actuated motor for moving one of said members relative to the other, a valve for controlling the flow of fluid to said motor, a control member connected to said valve, and automatic means operatively connecting said control member and said movable members for controlling said valve to move one of said movable members in predetermined relation to the movement of the other of said movable members.

32. In a machine tool, the combination of a frame, a rotatable spindle supported by said frame, a slide supported by said frame, a fluid pressure actuated motor for reciprocating said slide, an indexible turret supported by said slide, a valve for controlling the flow of fluid to said motor, a cam roll carried by said slide and indexible with said turret, cams on said cam roll adapted to control said valve to vary the rate of movement of said slide, and means for maintaining a constant motion for said slide during a portion of each reciprocation, said means including a member rotated in timed relation with the rotation of said spindle and cooperating means carried by said slide and operatively connected to said valve.

EDWARD P. BURRELL.